US007441264B2

(12) United States Patent  
Himmel et al.

(10) Patent No.: US 7,441,264 B2
(45) Date of Patent: Oct. 21, 2008

(54) SECURITY OBJECTS CONTROLLING ACCESS TO RESOURCES

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 10/179,328

(22) Filed: Jun. 24, 2002

(65) Prior Publication Data

US 2003/0237006 A1    Dec. 25, 2003

(51) Int. Cl.
*G06F 7/04* (2006.01)
*H04K 1/00* (2006.01)

(52) U.S. Cl. .......................................... 726/2; 713/182
(58) Field of Classification Search .................. 726/2; 713/182

See application file for complete search history.

(56) References Cited

U.S. PATENT DOCUMENTS

| 5,335,346 | A | 8/1994 | Fabbio |
| 5,365,574 | A | 11/1994 | Hunt et al. |
| 5,592,553 | A | 1/1997 | Guski et al. |
| 5,606,663 | A | 2/1997 | Kadooka |
| 5,619,571 | A | 4/1997 | Sandstrom et al. |
| 5,661,807 | A | 8/1997 | Guski et al. |
| 5,752,244 | A | 5/1998 | Rose et al. |
| 5,787,427 | A | 7/1998 | Benantar et al. |
| 5,913,025 | A | 6/1999 | Higley et al. |
| 5,922,073 | A | 7/1999 | Shimada |

(Continued)

FOREIGN PATENT DOCUMENTS

| JP | 10091266 A | 4/1998 |
| WO | WO 00/43877 | 7/2000 |
| WO | WO 00/60454 A2 | 10/2000 |

OTHER PUBLICATIONS

Benantar, et al.; System, Method, and Article of Manufacture for Access Control Onmethod Invocation on a Protected Object in an Object Oriented System; 1995; pp. 1-7; IBM Dossier No. AUS919950093; US.

(Continued)

*Primary Examiner*—Emmanuel L Moise
*Assistant Examiner*—Ali S Abyaneh
(74) *Attorney, Agent, or Firm*—Thomas D. Fortenberry; Justin Dillon; Biggers & Ohanian, LLP

(57) ABSTRACT

Controlling access to resources through use of security objects including creating a security object in dependence upon user-selected security control data types, the security object comprising security control data and at least one security method; receiving a request for access to the resource; receiving security request data; and determining access to the resource in dependence upon the security control data and the security request data. Creating a security object includes storing in the security object a resource identification for the resource; storing in the security object an authorization level of access for the resource; storing in the security object user-selected security control data types; and storing in the security object security control data for each user-selected security control data type. Embodiments include deploying the security object on a security server or on a client device.

2 Claims, 5 Drawing Sheets

U.S. PATENT DOCUMENTS

| | | | |
|---|---|---|---|
| 5,944,825 | A | 8/1999 | Bellemore et al. |
| 5,991,879 | A | 11/1999 | Still |
| 6,029,247 | A | 2/2000 | Ferguson |
| 6,073,242 | A | 6/2000 | Hardy et al. |
| 6,105,072 | A | 8/2000 | Fischer |
| 6,107,935 | A | 8/2000 | Comerford et al. |
| 6,158,010 | A | 12/2000 | Moriconi et al. |
| 6,173,404 | B1 | 1/2001 | Colburn et al. |
| 6,192,405 | B1 | 2/2001 | Bunnell |
| 6,275,941 | B1* | 8/2001 | Saito et al. ............ 726/2 |
| 6,609,198 | B1* | 8/2003 | Wood et al. ............ 713/155 |
| 6,910,041 | B2* | 6/2005 | Exton et al. ............ 707/9 |
| 2002/0007461 | A1* | 1/2002 | Garrison ............ 713/202 |
| 2002/0032873 | A1* | 3/2002 | Lordemann et al. ...... 713/201 |
| 2002/0157016 | A1* | 10/2002 | Russell et al. ............ 713/200 |

OTHER PUBLICATIONS

Smith et al.; Apparatus and Method for Security Object Enhancement and Management; 2001;pp. 1-3; IBM Dossier No. AUS920010559; US.

Wilson, et al.; Views as the Security Objects in a Multilevel Secure Relational Database Management System; 1988; pp. 70-84; IEEE; US.

Deng, et al.; Integrating security in CORBA Based Object Architectures; 1995; pp. 50-61; IEEE; US.

Park, et al.; Tools for Information Security Assurance Arguments; 2001; pp. 287-296; IEEE; US.

Kaji, et al.; Seamless Object Authentication: A Security Mechanism for Mobile Codes; Mar. 2001; pp. 586-594; vol. 42, No. 3; Inf. Process. Soc.; JP.

Izaki, et al.; Access Control Model in Object-Oriented Systems; 2000; pp. 69-74; IEEE Comput. Soc; US.

Hale, et al; Programmable Security for Object-Oriented Systems; Database Security XII; 1999; pp. 109-123; Kluwer Academic Publishers; US.

Karjoth; Authorization in CORBA Security; Journal of Computer Security 8; 2000; vol. 8, No. 2-3; IOS Press; Netherlands.

* cited by examiner

SECURITY OBJECTS CONTROLLING ACCESS TO RESOURCES

BACKGROUND OF THE INVENTION

1. Field of the Invention

The present invention relates to data processing methods, apparatus, systems, and computer program products therefor, and more particularly to methods, apparatus, systems, and computer program products in support of securing valid authentication and authorization for access to computer resources and other items.

2. Description of Related Art

It is common to use passwords to control access to resources, including everything from documents, to bank accounts, burglar alarms, automobiles, home security systems, personal video recorders, and so on. Passwords often consist of text strings that a user must provide to a security system in order to obtain access to a secured resource. A password provided by a user typically is checked against a stored password to determine a match. If the entered password and the stored password match, access is granted to the resource.

Mechanisms for managing passwords typically are programmed into the software applications with which the passwords are associated. That is, a program external to the password is used to authenticate the password, check to see if the password is about to expire, and determine the access granted. Systems securing resources therefore typically have password management operations coded into them to process and authenticate a specific type of password content. Users have no control over how passwords are defined or used in typical systems securing resources. Moreover, changing the way in which a password is used typically requires changing program code in a system securing resources.

In addition, such systems generally are capable of accepting and administering security with respect only one type of password. If passwords are viewed as one type of security control data, then such systems can be said to function with only one kind of security control data. There is no way in such systems for anyone, especially not a user, to change from a password to some other kind of security control data without substantial redesign and recoding. There is no way in such system for a user or anyone else to determine to use more than one kind of security control data without substantial redesign and recoding. It would be beneficial to have improved ways of choosing and using security control data to secure resources through computer systems.

SUMMARY OF THE INVENTION

Various exemplary embodiments of the invention are described as methods, systems, and products for controlling access to a resource including creating a security object in dependence upon user-selected security control data types, the security object comprising security control data and at least one security method; receiving a request for access to the resource; receiving security request data; and determining access to the resource in dependence upon the security control data and the security request data. Creating a security object typically includes storing in the security object a resource identification for the resource; storing in the security object an authorization level of access for the resource; storing in the security object user-selected security control data types; and storing, in the security object, security control data for each user-selected security control data type. Methods according to the present invention typically include deploying the security object on a security server or on a client device.

In some embodiments of the present invention, the resource resides on a resource server, an embodiment includes deploying the security object on a security server, and receiving a request for access to a resource further comprises receiving the request for access to the resource in a security server from a client device across a network. In other embodiments, the resource resides on a client device, the client device has an application program, the method further comprises deploying the security object on the client device, and receiving a request for access to the resource further comprises receiving the request for access to the resource in the security object itself as a call to the security method.

In typical embodiments, determining access includes authorizing a level of access in dependence upon the authorization level of access for the resource. In many embodiments, receiving a request for access to a resource includes calling a security method in a security object. Receiving a request for access to a resource typically includes identifying a security object controlling access to the resource. In some embodiments, identifying the security object comprises identifying the security object in dependence upon a Universal Resource Identifier ("URI"). In some embodiments, identifying the security object comprises identifying the security object in dependence upon a URI that identifies the resource, including finding, in dependence upon the URI identifying the resource, an identification of the security object in an access control table.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1A:
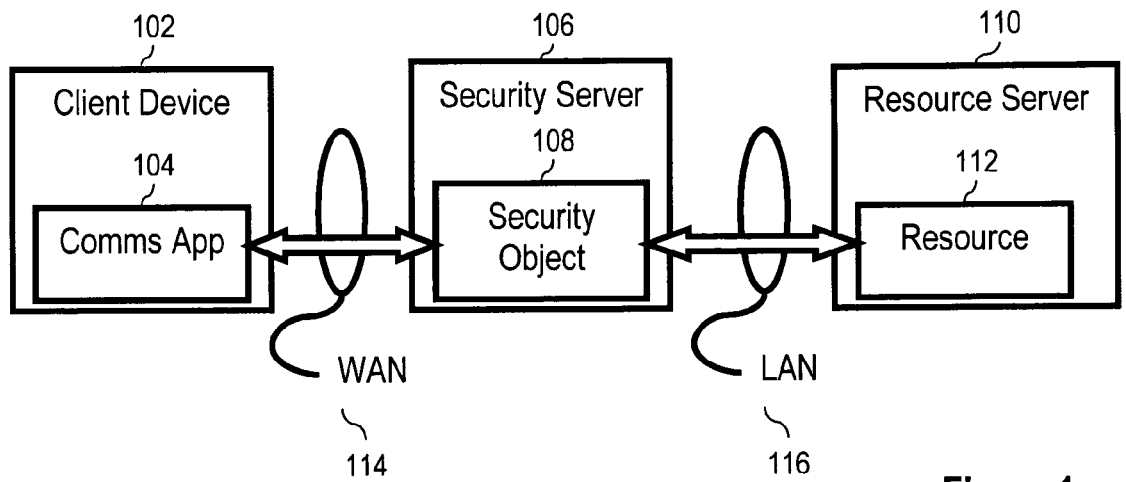
FIGS. 1a, 1b, and 1c set forth block diagrams depicting alternative exemplary data processing architectures useful in various embodiments of the present invention.

The present invention is described to a large extent in this specification in terms of methods for securing valid authentication and authorization for access to computer resources and other items. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product and stored on a diskette or other recording medium for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

"Browser" means a web browser, a communications application for locating and displaying web pages. Browsers typically comprise a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers." Microbrowsers in wireless web-enabled devices often support markup languages other than HTML, including for example, WML, the Wireless Markup Language.

"CORBA" means the Common Object Request Broker Architecture, a standard for remote procedure invocation first published by the Object Management Group ("OMG") in 1991. CORBA can be considered a kind of object-oriented way of making "RPCs" or remote procedure calls, although CORBA supports many features that do not exist in RPC as such. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages such as C++ and Java look like invocations of local member methods in local objects. Whenever a client program, such as, for example, a C++ program, acquires an object reference, decoded from a stringified object reference, from a Naming Service, or as a result from another method invocation, an ORB creates a stub object. Since a stub object cannot exist without an object reference, and an object reference rarely exists outside a stub object, these two terms are often used synonymously. For the server side, a skeleton is generated by the IDL compiler. A developer derives from that skeleton and adds implementation; an object instance of such an implementation class is called a 'servant.' The generated skeleton receives requests from the ORB, unmarshalls communicated parameters and other data, and performs upcalls into the developer-provided code. This way, the object implementation also looks like a 'normal' class.

"CGI" means "Common Gateway Interface," a standard technology for data communications of resources between web servers and web clients. More specifically, CGI provides a standard interface between servers and server-side 'gateway' programs which administer actual reads and writes of data to and from file systems and databases. The CGI interface typically sends data to gateway programs through environment variables or as data to be read by the gateway programs through their standard inputs. Gateway programs typically return data through standard output.

"Client device" refers to any device, any automated computing machinery, capable of requesting access to a resource. Examples of client devices are personal computers, internet-enabled special purpose devices, internet-capable personal digital assistants, wireless handheld devices of all kinds, garage door openers, home security computers, thumbprint locks on briefcases, web-enabled devices generally, and handheld devices including telephones, laptop computers, handheld radios, and others that will occur to those of skill in the art. Various embodiments of client devices are capable of asserting requests for access to resources via wired and/or wireless coupling; for data communications. The use as a client device of any instrument capable of a request for access to a resource is well within the present invention.

A "communications application" is any data communications software capable of operating couplings for data communications, including email clients, browsers, special purpose data communications systems, as well as any client application capable of accepting data downloads (downloads of security objects or resources, for example) via hardwired communications channels such as, for example, a Universal Serial Bus or 'USB,' downloads through wired or wireless networks, and downloads through other means as will occur to those of skill in the art. In typical embodiments of the present invention, communications applications run on client devices.

"DCOM" means 'Distributed Component Object Model,' an extension of Microsoft's Component Object Model ("COM") to support objects distributed across networks. DCOM is part of certain Microsoft operating systems, including Windows NT, and is available for other operating systems. DCOM serves the same purpose as IBM's DSOM protocol, which is a popular implementation of CORBA. Unlike CORBA, which runs on many operating systems, DCOM is currently implemented only for Windows.

"HTML" stands for 'HyperText Markup Language,' a standard markup language for displaying web pages on browsers.

"HTTP" stands for 'HyperText Transport Protocol,' the standard data communications protocol of the World Wide Web.

A "hyperlink," also referred to as "link" or "web link," is a reference to a resource name or network address which when invoked allows the named resource or network address to be accessed. More particularly in terms of the present invention, invoking a hyperlink implements a request for access to a resource. Often a hyperlink identifies a network address at which is stored a resource such as a web page or other document. As used here, "hyperlink" is a broader term than "HTML anchor element." Hyperlinks include links effected through anchors as well as URIs invoked through 'back' buttons on browsers, which do not involve anchors. Hyperlinks include URIs typed into address fields on browsers and invoked by a 'Go' button, also not involving anchors. In addition, although there is a natural tendency to think of hyperlinks as retrieving web pages, their use is broader than that. In fact, hyperlinks access "resources" generally available through hyperlinks including not only web pages but many other kinds of data and server-side script output, servlet output, CGI output, and so on.

"LAN" means local area network.

"Network" is used in this specification to mean any networked coupling for data communications among computers or computer systems. Examples of networks useful with the invention include intranets, extranets, internets, local area networks, wide area networks, and other network arrangements as will occur to those of skill in the art.

An "ORB" is a CORBA Object Request Broker.

"Resource" means any information or physical item access to which is controlled by security objects of the present invention. Resources often comprise information in a form capable of being identified by a URI or URL. In fact, the 'R' in 'URI' is 'Resource.' The most common kind of resource is a file, but resources include dynamically-generated query results, the output of CGI scripts, dynamic server pages, documents available in several languages, as well as physical objects such as garage doors, briefcases, and so on. It may sometimes be useful to think of a resource as similar to a file, but more general in nature. Files as resources include web pages, graphic image files, video clip files, audio clip files, and so on. As a practical matter, most HTTP resources are currently either files or server-side script output. Server side script output includes output from CGI programs, Java servlets, Active Server Pages, Java Server Pages, and so on.

"RMI," or "Java RMI," means 'Remote Method Invocation,' referring to a set of protocols that enable Java objects to communicate remotely with other Java objects. RMI's structure and operation is somewhat like CORBA's, with stubs and skeletons, and references to remotely located objects. In comparison with other remote invocations protocols such as CORBA and DCOM, however, RMI is relatively simple. RMI, however, works only with Java objects, while CORBA and DCOM are designed to support objects created in any language.

"Server" in this specification refers to a computer or device comprising automated computing machinery on a network that manages resources and requests for access to resources. A "security server" can be any server that manages access to resources by use of security objects according to the present invention. A "web server," or "HTTP server," in particular is a server that communicates with browsers by means of HTTP in order to manage and make available to networked computers documents in markup languages like HTML, digital objects, and other resources.

A "Servlet," like an applet, is a program designed to be run from another program rather than directly from an operating system. "Servlets" in particular are designed to be run on servers from a conventional Java interface for servlets. Servlets are modules that extend request/response oriented servers, such as Java-enabled web servers. Java servlets are an alternative to CGI programs. The biggest difference between the two is that a Java servlet is persistent. Once a servlet is started, it stays in memory and can fulfill multiple requests. In contrast, a CGI program disappears after it has executed once, fulfilling only a single a request for each load and run. The persistence of Java servlets makes them generally faster than CGI because no time is spent on loading servlets for invocations after a first one.

A "URI" or "Universal Resource Identifier" is an identifier of a named object in any namespace accessible through a network. URIs are functional for any access scheme, including for example, the File Transfer Protocol or "FTP," Gopher, and the web. A URI as used in typical embodiments of the present invention usually includes an internet protocol address, or a domain name that resolves to an internet protocol address, identifying a location where a resource, particularly a web page, a CGI script, or a servlet, is located on a network, usually the Internet. URIs directed to particular resources, such as particular HTML files or servlets, typically include a path name or file name locating and identifying a particular resource in a file system coupled through a server to a network. To the extent that a particular resource, such as a CGI file or a servlet, is executable, for example to store or retrieve data, a URI often includes query parameters, or data to be stored, in the form of data encoded into the URI. Such parameters or data to be stored are referred to as 'URI encoded data.'

"URLs" or "Universal Resource Locators" comprise a kind of subset of URIs, wherein each URL resolves to a network address. That is, URIs and URLs are distinguished in that URIs identify named objects in namespaces, where the names may or may not resolve to addresses, while URLs do resolve to addresses. Although standards today are written on the basis of URIs, it is still common to such see web-related identifiers, of the kind used to associate web data locations with network addresses for data communications, referred to as "URLs." This specification refers to such identifiers generally as URIs.

"WAN" means 'wide area network.' One example of a WAN is the Internet.

"World Wide Web," or more simply "the web," refers to a system of internet protocol ("IP") servers that support specially formatted documents, documents formatted in markup languages such as HTML, XML (eXtensible Markup Language), WML (Wireless Markup Language), or HDML (Handheld Device Markup Language). The term "Web" is used in this specification also to refer to any server or connected group or interconnected groups of servers that implement a hyperlinking protocol, such as HTTP or WAP (the 'Wireless Access Protocol'), in support of URIs and documents in markup languages, regardless of whether such servers or groups of servers are coupled to the World Wide Web as such.

Detailed Description

Figure 1B:
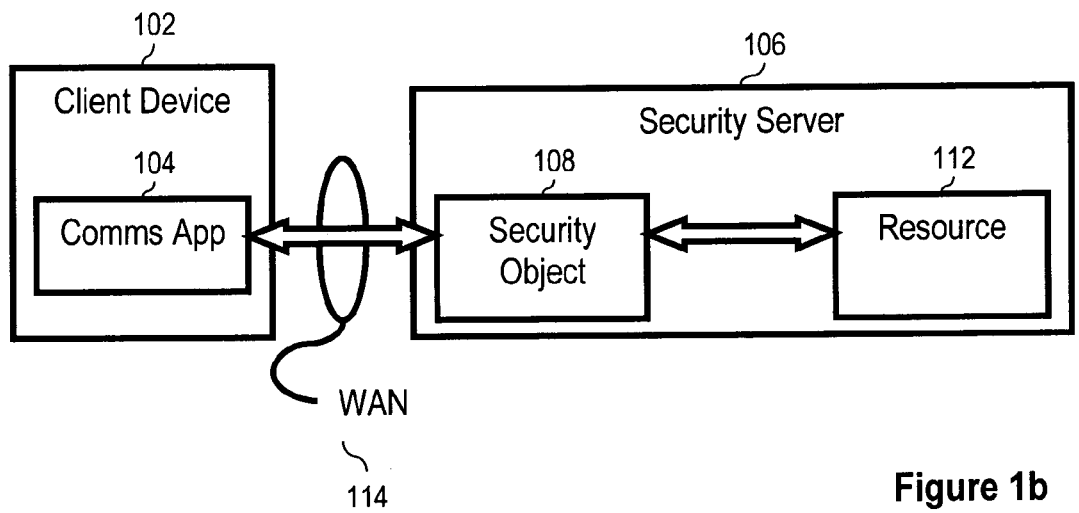
Figure 1C:
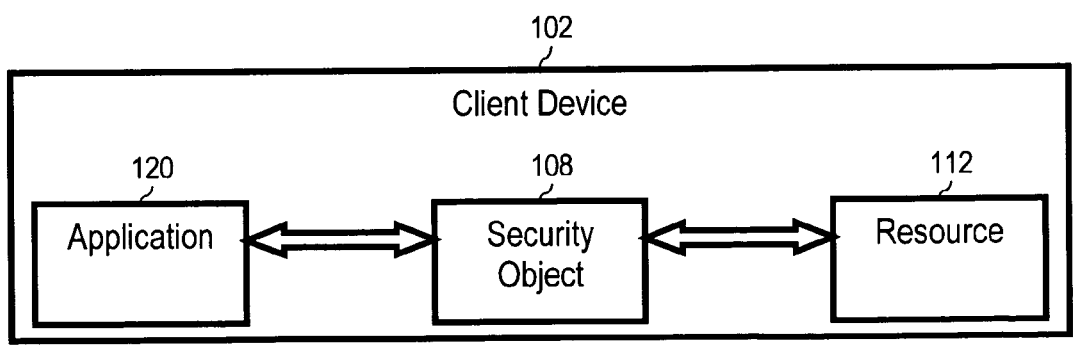

Embodiments of the present invention provide security objects for improving the administration of controlling access to secured resources. FIGS. 1a, 1b, and 1c set forth block diagrams depicting alternative exemplary data processing architectures useful in various embodiments of the present invention.

As illustrated in FIG. 1a, some embodiments of the present invention deploy security objects (108) in security servers (106) coupled for data communications through LANs (116) to resource servers (110) upon which resources (112) are stored. Such embodiments typically are coupled for data communications to client devices (102) through networks such as WANs (114) or LANs (116). Data communications between client devices and security servers in such architectures are typically administered by communications applications (104), including, for example, browsers. WANs include internets and in particular the World Wide Web. Client devices (102) are defined in detail above and include any automated computing machinery capable of accepting user inputs through a user interface and carrying out data communications with a security server. A "security server" is any server that manages access to resources by use of security objects according to the present invention.

As illustrated in FIG. 1b, some embodiments of the present invention deploy security objects (108) in security servers (106) upon which are stored secured resources (112). The architecture of FIG. 1b illustrates that resources can be stored on the same server that secures access to the resources. In all this discussion, the term 'security server' refers to a server that manages access to resources by use of security objects according to the present invention. There is no limitation that a 'security server' as the term is used in this disclosure must provide other security services, or indeed that a security server must provide any security services whatsoever, other than managing access to resources through security objects. FIGS. 1a and 1b show security objects deployed in or upon security servers, but having security objects deployed upon it is not a requirement for a server to be considered a security server within the usage of this disclosure. Security objects may be deployed anywhere on a network or on client devices. If a server manages access to resources by use of security objects, regardless where the security objects are located, then that server is considered a 'security server' in the terminology of this disclosure. Some 'security servers' of the present invention, as described in more detail below, are ordinary web servers modified somewhat to support lookups in access control tables. Many 'security servers' of the present invention, however, are ordinary unmodified web servers or Java web servers, designated as 'security servers' only because they manage access to resources by use of security objects, security objects which may or may not be installed upon those same servers.

Figure 2:
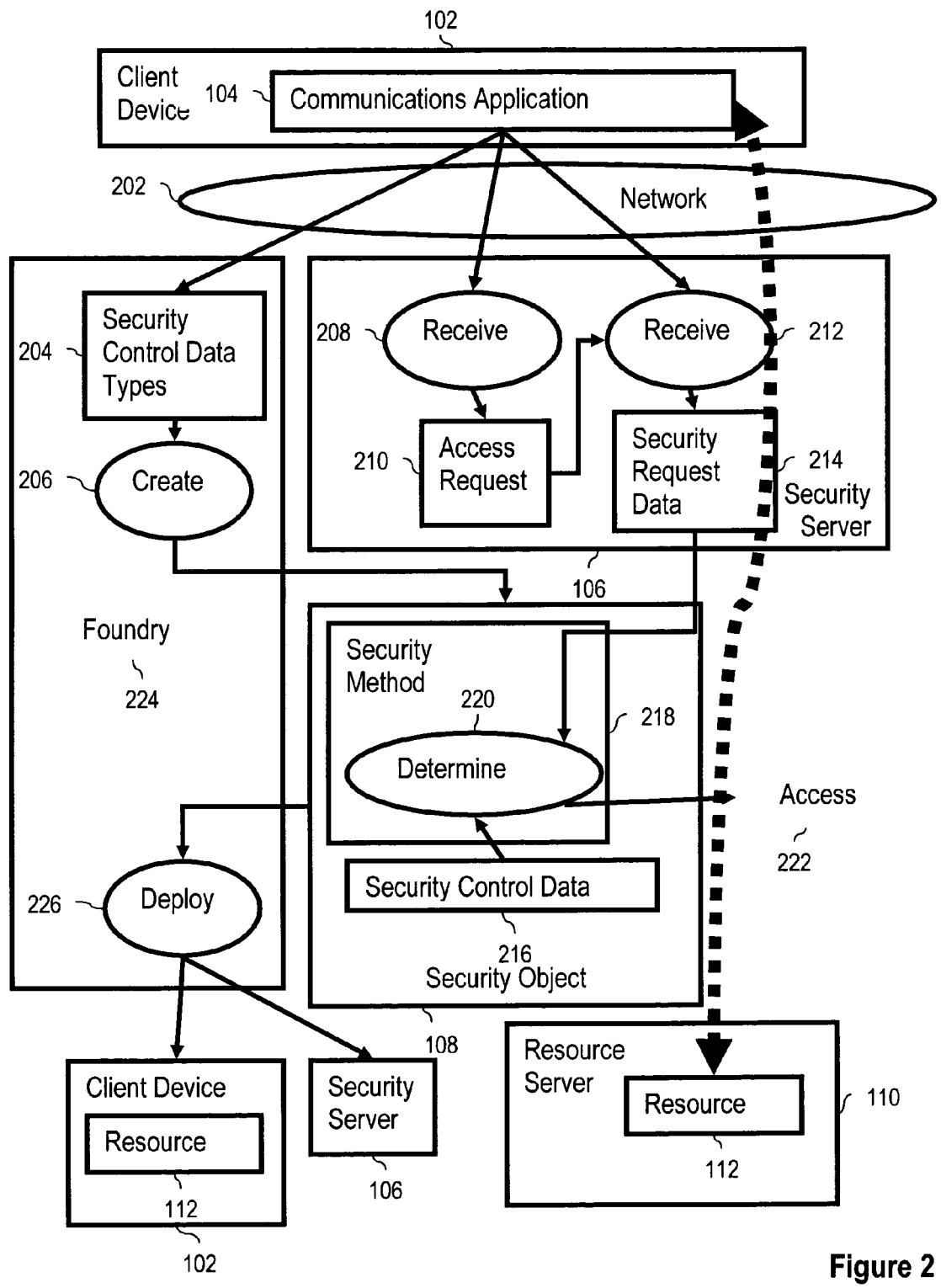
FIG. 2 sets forth a data flow diagram depicting exemplary methods of controlling access to a resource, including creating a security object and receiving a request for access to a resource, and determining whether to grant access to the resource.

As shown in FIG. 1c, some embodiments deploy security objects (108) in client devices (102) which themselves also contain both the applications software (120) concerned with accessing the resources and also the resources (112) themselves. This architecture includes devices in which a security object may be created on a more powerful machine and then downloaded to a less powerful machine. The less powerful machine then often is associated one-to-one with a single resource, or is used to secure a relatively small number of resources. One example of this kind of embodiment includes a garage door opener in which a security application program (120) is implemented as an assembly language program on a tiny microprocessor or microcontroller and the secured resource is a motor that operates a garage door. Another example is a briefcase fitted with a microprocessor or microcontroller, a fingerprint reader, and a USB port through which is downloaded a security object that controls access to a resource, an electromechanical lock on the briefcase. FIG. 2 sets forth a data flow diagram depicting an exemplary method of controlling access to a resource (112). The method of FIG. 2 includes creating (206) a security object (108) in dependence upon user-selected security control data types (204), the security object comprising security control data (216). In this disclosure, the application programs that administer the creation of security objects are called 'foundries.' In typical embodiments according to FIG. 2, a foundry (224) prompts a user through a user interface displayed on a client device (102) to select one or more security control data types through, for example, use of a menu similar to this one:

Please select a security control data type:
1. User Logon ID
2. Password
3. Fingerprint
4. Voice Recognition
5. Retinal Scan
Your selection (1-5): _____

The foundry (224) creates (206) the security object (108) in dependence upon the user's selections of security control data types in the sense that the foundry aggregates into, or associates by reference, the security object security control data types according to the user's selection. If, for example, the user selects menu item 1 for a user logon ID, the foundry causes a security control data type to be included in the security object for administration of a user logon ID. If the user selects menu item 2 for a password, the foundry causes a security control data type to be included in the security object for administration of a password. If the user selects menu item 3 for a fingerprint, the foundry causes a security control data type to be included in the security object for administration of fingerprints. And so on for voice recognition technology, retinal scans, and any other kind of security control data amenable to administration by electronic digital computers.

In typical embodiments of the present invention, as shown in FIG. 2, a security object (108) includes at least one security method (218). In this disclosure, 'security method' means an object oriented member method. The security method typically is a software routine called for validating or determining whether to grant access to a resource and what level of authorization to grant. As discussed in more detail below, the security method can have various names depending on how the security object is implemented, 'main( )' for security objects to be invoked with Java commands, 'security( )' for servlets, and so on. These exemplary names are for clarity of explanation only, not for limitation. In many forms of security object, the name chosen for the security method is of no concern whatsoever.

Embodiments according to FIG. 2 include receiving (208) a request (210) for access to the resource and receiving a request for access to a resource can be implemented as a call to a security method in a security object. A security object implemented in Java, for example, can have a main( ) method called by invocation of the security object itself, as in calling 'java MySecurityObject,' resulting in a call to MySecurityObject.main( ). This call to main( ) is in many embodiments itself receipt of a request for access to the resource secured by use of the security object.

The method of FIG. 2 includes receiving (212) security request data (214). Continuing with the example of a security object called 'MySecurityObject,' the security object's member security method can prompt the user, or cause the user to be prompted, for security request data in dependence upon the security control data types in use in the security object. That is, if the security object contains security control data of type 'User Logon ID,' then the security method causes the user to be prompted to enter security request data, expecting the security request data received to be a user logon ID. If the security object contains security control data of type 'Password,' then the security method causes the user to be prompted to enter security request data, expecting the security request data received to be a password. If the security object contains security control data of type 'Fingerprint,' then the security method causes the user to be prompted to enter security request data, expecting the security request data received to be a digital representation of a fingerprint. The security method in such embodiments typically does not include in its prompt to the user any identification of the security control data type expected. This is, after all, a security system. If the user does not know that the user must provide in response to a first prompt a password and in response to a second prompt a thumbprint in order to gain access to a particular resource, then the user probably ought not gain access to the resource.

As described in more detail below, security objects typically associate by reference one or more security control objects having member methods that carry out actual security request data validation. Calls from a security object's security method to member methods in security control objects are what is meant by saying that a security method "causes" a user to be prompted for security request data.

The method of FIG. 2 includes determining (220) access (222) to the resource in dependence upon the security control data (216) and the security request data (214). More particularly, determining access means determining whether to grant access and what kind of access is to be granted. Generally in this disclosure, whether to grant access to a particular user is referred to as 'authentication,' and the kind of access granted is referred to as 'authorization level.' Determining whether to grant access typically includes determining whether security access data provided by a user in connection with a request for access to a resource matches corresponding security control data. That is, in the example of a password, determining whether to grant access includes determining whether a password provided as security access data matches a password stored in aggregation with a security object as security control data. In the example of a thumbprint, determining whether to grant access includes determining whether a thumbprint provided as security access data matches a thumbprint stored in aggregation with a security object as security control data. And so on. Authorization levels include authorization to read a resource, authorization to write to a resource (which typically includes 'edit' authority and 'delete' authority), and authorization to execute a resource (for which one ordinarily needs an executable resource).

Figure 3:
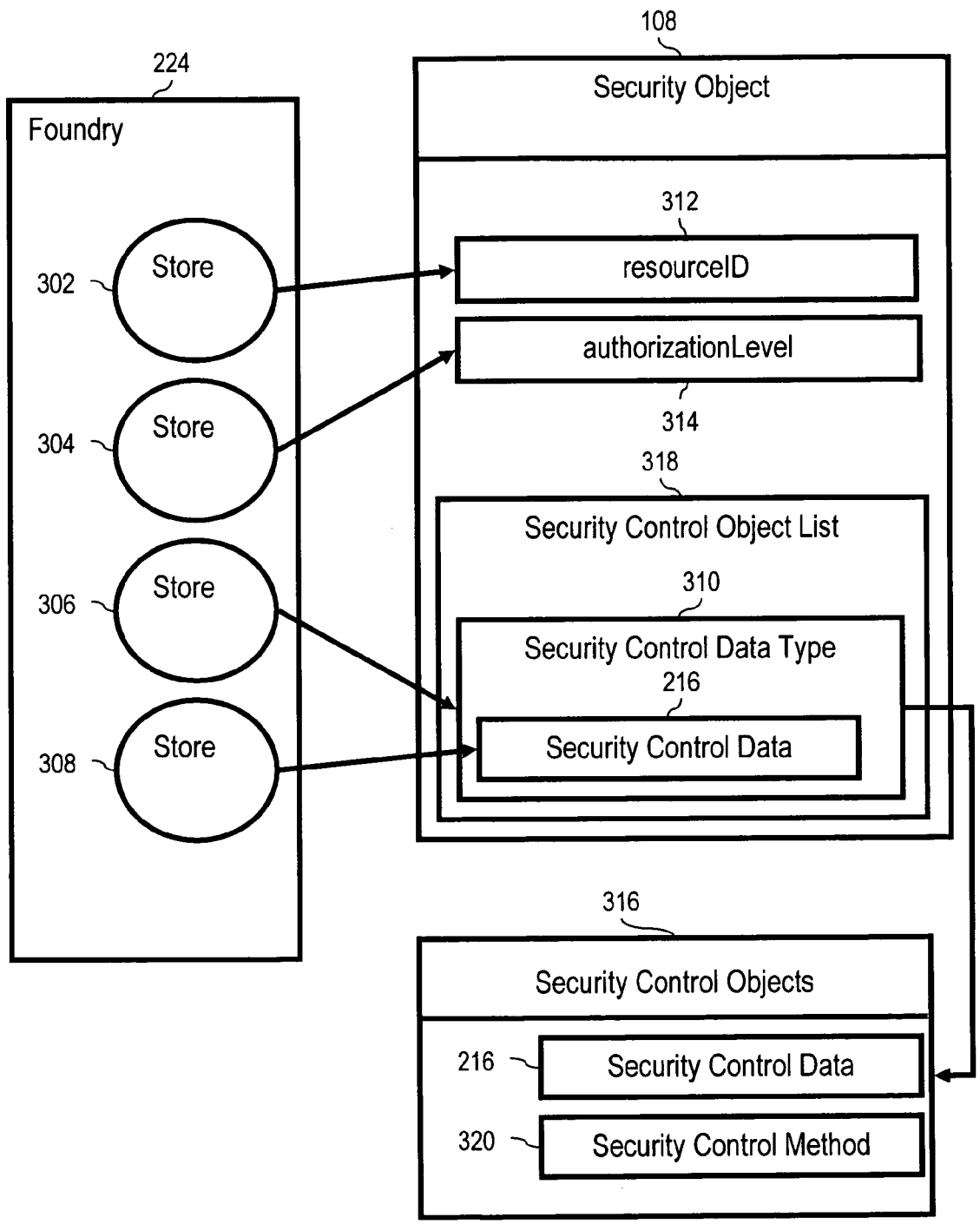
FIG. 3 sets forth a data flow diagram depicting an exemplary method of creating a security object.

FIG. 3 sets forth a data flow diagram depicting an exemplary method of creating a security object. In other words, the method depicted in FIG. 3 drills down on what it means to create a security object in a foundry of the present invention. In the method of FIG. 3 creating a security object is shown to include storing (302) in the security object (108) a resource identification (312) for the resource. In other words, the foundry prompts the user to enter a filename, pathname, URL, URI, or any useful means as will occur to those of skill in the art for identifying a resource to be secured by the security object. In this example, the foundry then stores (302) the identification of the resource in a member field called 'resourceID' (312) in the security object itself.

In the method of FIG. 3 creating a security object includes storing (304) in the security object (108) an authorization level (314) of access for the resource. In other words, the foundry prompts the user to enter an authorization level, 'read,' 'write,' or 'execute,' for example, and then stores (304) the authorization level in a member field named 'authorizationLevel' (314) in the security object itself.

In the method of FIG. 3, creating a security object includes storing (306) in the security object (108) user-selected security control data types (310). More particularly, in the method of FIG. 3, security control data types (310) are stored as references to security control objects (316). Security control data types (310) in fact are security control classes (404 on FIG. 4) from which security control objects are instantiated. Storing (306) user-selected security control data types comprises storing references to security control objects (316) in a security control object list (318) in the security object (108), including instantiating a security control object (316) of a security control class in dependence upon security control data type. That is, if the security control data type is a password, then the foundry causes to be instantiated from a password security control class a password security control object, storing in the security control object list (318) a reference to the password security control object. Similarly, if the security control data type is a fingerprint, then the foundry causes to be instantiated from a fingerprint security control class a fingerprint security control object, storing in the security control object list (318) a reference to the fingerprint security control object. And so on.

The security control object list (318) itself is typically implemented as a container object from a standard library in, for example, C++ or Java. That is, the security control object list (318) is typically a class object aggregated by reference to the security object (108).

In the method of FIG. 3, creating a security object includes storing (308) in the security object security control data (216) for each user-selected security control data type (310). Instantiating a security control object (316) calls a constructor for the security control object. In some embodiments, it is the constructor that prompts for security control data of the type associated with the security control object. That is, if the security control data object is a password security control object, its constructor prompts for a password to be stored (308) as security control data (216). Similarly, if the security control data object is a thumbprint security control object, its constructor prompts for a thumbprint to be stored (308) as security control data (216). And so on.

In architectures similar to those illustrated in FIGS. 1a and 1b in which a client device (102) is located remotely across a network (114) from a security server (106) upon which security control data is to be stored (308), the security control data advantageously is communicated across the network from the client device to the security server in encrypted form. One example of such encrypted communications is network messaging by use of 'SSL,' that is, communications connections through a 'Secure Sockets Layer,' a known security protocol for use in internet protocol ("IP") networks, in which encryption of message packets is provided as a standard communications service. In addition to encrypted communications of security control data, at least some elements of security control data, such as, for example, passwords, also are advantageously stored (308) in encrypted form.

Even more particularly, foundries according to the present invention may be implemented and operated in accordance with the following pseudocode.

```
Class Foundry {
private String selectionText =
    "Please select a security control data type:
        1. Password
        2. Fingerprint
        3. Voice Recognition
    Your selection (1-3): ___"
void main( ) {
    // create security object
    SecurityClass SO = new SecurityClass( );
    // identify resource secured by the new security object
    Resource resourceID =
        getResourceID("Please enter resource ID: ___");
    // store resource ID in security object
    SO.setResource(resourceID);
    // prompt for authorization level
    char authorizationLevel =
        getAuthorizationLevel("Please enter authorization level: ___");
    // store authorization level in security object
```

```
        SO.setAuthorizationLevel(authorizationLevel);
        // get a first 'SCD-Type,' Security Control Data Type
        SCD-Type = getUserSelection(selectionText);
            while(SCD-Type != null) {
                // based on SCD-Type, create Security Control Object
                SCO = SCO-Factory.createSCO(SCD-Type);
                // store security control data in the security control object
                SCO.setSecurityControlData( );
                // add new SCO to the list in the Security Object
                SO.add(SCO);
                // get another SCD-Type, as many as user wants
                SCD-Type = getUserSelection(selectionText);
            } // end while( )
    } // end main( )
} // end Foundry
```

With reference to FIGS. 2 and 3, the pseudocode foundry creates (206) a security object (108) by instantiating a security class:

SecurityClass SO=new SecurityClass( ).

The pseudocode foundry then stores (302) a resource identification (312) through:

Resource resourceID=getResourceID("Please enter resource ID: _____");
  SO.setResource(resourceID);

The call to SO.setResource( ) is a call to a member method in the security object described in more detail below. The pseudocode foundry stores (304) an authorization level (314) through:

char authorizationLevel=getAuthorizationLevel("Please enter authorization level: _____");
  SO.setAuthorizationLevel(authorizationLevel);

The call to SO.setAuthoriztionLevel( ) is a call to a member method in the security object described in more detail below.

The pseudocode foundry stores (306) security control data types (310) by repeated calls to SO.add(SCO). SO.add( ) is a member method in the security object that adds security control objects to a list in the security object as described in more detail below.

The pseudocode foundry stores (308) security control data (216) in the security object (108) by repeated calls to SCO.setSecurityControlData( ). SCO.setSecurityControlData( ) is a member method in a security control object (316) that prompts for and stores a type of security data with which the security control object is associated, fingerprints for fingerprint security control object, passwords for password security control objects, and so on. A separate security control object is created for each security control data type selected or request by the user in response to getUserSelection(selectionText).

Each time the user selects a new security control data type, the foundry creates a new security control object by calling a factory method in a security control object factory. The security control object factory is a class called SCO-Factory, and the factory method is SCO-Factory.createSCO( ). The calls to SCO.setSecurityControlData( ) are polymorphic calls, each of which typically accesses a different security control object although exactly the same line of code is used for each such call. In this elegant solution, the foundry itself never knows or cares which security control data types are implemented or what security control data is stored in security objects it creates.

Readers of skill in the art may notice that the foundry could be made even leaner by allowing security control object constructors to carry out the work of SCO.setSecurityControlData( ). In this example, however, for clarity of explanation of the operation of the foundry, SCO.setSecurityControlData( ) is left at the foundry level so that the effects of foundry operations are more fully exposed by the foundry itself.

The process of creating security control objects can be carried out as illustrated in the following pseudocode factory class:

```
//
// Security Control Object Factory Class
//
// Defines a parameterized factory method for creating security control
// objects
//
class SCO-Factory {
    public static SecurityControlClass createSCO(SCD-Type) {
        // establish null reference to new Security Control Object
        SecurityControlClass SecurityControlObject = null;
        switch(SCD-Type) {
            case LOGONID:
                SecurityControlObject = new
                    LogonIDSecurityControlClass;
                break;
            case PASSWORD:
                SecurityControlObject = new
                    PasswordSecurityControlClass;
                break;
            ... ... ...   // Can have many security control data types,
                          // not merely these four
            case FINGERPRINT:
                SecurityControlObject = new
                    FingerprintSecurityControlClass;
                break;
            case RETINA:
                SecurityControlObject = new
                    RetinaSecurityControlClass;
                break;
        } // end switch( )
        return SecurityControlObject;
    } // end createSCO ( )
} // end class SCO-Factory
```

The factory class implements the createSCO( ) method, which is a so-called parameterized factory method. CreateSCO( ) accepts as a parameter the security control data type 'SCD-Type' of the security control data to be administered by a security control object. CreateSCO( ) then operates a switch( ) statement in dependence upon SCD-Type to decide exactly which security control class to instantiate depending on which type of security control data is needed—logon IDs, passwords, fingerprints, voice identifications, and so on. Although only four security control data types are illustrated in the factory class (logon IDs, passwords, fingerprints, and retinal scans), in fact the factory can create and return to the calling foundry a security control object for any type of security control data supported by the security system in which it is installed, that is, any type of security control object for which a security control data type or class (404) is defined.

Security control objects can be instantiated from a security control class according to the following pseudocode security control class:

```
//
// abstract SecurityControlClass
//
Abstract Class SecurityControlClass {
    private String SecurityControlData;
    public void setSecurityControlData( ) {
        SecurityControlData =
            prompt("Please enter security control data: ___);
```

-continued
```
    }
    public boolean validate( ) {
        SecurityAccessData =
            prompt("Enter Security Access Data: _____");
        if(SecurityControlData == SecurityAccessData) return true;
        else return false;
    }
}
```

The pseudocode security control class depicts an object oriented 'interface.' In Java, such structures are literally known as 'interfaces' to be 'extended' by concrete classes. In C++, such structures are known as abstract base classes from which concrete subclasses inherit. Either way, the pseudocode security control class establishes a set of public member methods to be used by all security control objects. The pseudocode security control class provides string storage of security control data, which may work just fine for logon IDs and passwords, but will not work for fingerprints and voice recognition. Similarly, setSecurityContolDate( ) and validate( ) will be implemented differently for different types of security control data.

The member fields and member methods of the pseudocode security control class form an interface that is fully expected to be overridden in subclasses from which security control objects are instantiated, although all subclasses are required to implement in some fashion the public member fields and public member methods of the abstract base class, the security control class. Here, beginning with a concrete security control class for logon IDs, are several examples of concrete security control classes from which practical security control objects are instantiated by the factory method SecurityControlClass.createSCO( ).

```
//
// concrete security control class for logon IDs
//
Class LogonIDSecurityControlClass : SecurityControlClass {
    private String SecurityControlData;
    public void setSecurityControlData( ) {
        SecurityControlData =
            prompt("Please enter security control data: ___);
    }
    public boolean validate( ) {
        SecurityAccessData =
            prompt("Enter Security Access Data: _____");
        if(SecurityControlData == SecurityAccessData) return true;
        else return false;
    }
}
```

The LogonIDSecurityControlClass appears almost identical to its parent SecurityControlClass, but it is important to remember that LogonIDSecurityControlClass, unlike its abstract parent, defines a class that can actually be instantiated as a security control object for determining access to resources on the basis of entry of a valid logon ID. The following pseudocode security control class for fingerprints illustrates how security control classes differ across security control data types.

```
//
// concrete security control class for fingerprints
//
```

-continued
```
Class FingerprintSecurityControlClass : SecurityControlClass {
    private File SecurityControlData;
    public void setSecurityControlData( ) {
        SecurityControlData =
            prompt("Please enter security control data: ___);
    }
    public boolean validate( ) {
        FILE SecurityAccessData =
            prompt("Enter Security Access Data: _____");
        if((bitwiseCompare(SecurityControlData,
            SecurityAccessData))!=true)
            return true;
        else return false;
    }
}
```

In FingerprintSecurityControlClass, SecurityControlData is in a file rather than a string. Similarly, the prompt( ) function in the validates method expects the user to provide a fingerprint file in response to the prompt for security control data. In addition, the bitwiseCompare( ) method, although not shown, is implemented to open both files, compare them bit by bit, and ultimately deny access to a resource if the comparison fails.

Security objects themselves can be implemented, for example, according to the following pseudocode security class.

```
//
// SecurityClass . . .
// a class from which security objects can be instantiated
//
Class SecurityClass
{
    private Resource aResourceID;
    public void setResourceID(resourceID) {
        aResourceID = resourceID
    }
    char anAuthorizationLevel;
    public void setAuthorizationLevel(authorizationLevel) {
        anAuthorizationLevel = authorizationLevel
    }
    // list of security control objects (references, actually)
    private List aList = new List( );
    // method for adding Security Control Objects to the List
    public void add(SCO) {
        aList.add(SCO);
    }
    // validate requests for access against all SCOs in the list
    public boolean main( )
    {
        SCO = aList.getFirst( );
        while(SCO != null)
        {
            if((SCO.validate( )) != true) {
                denyAccess( );
                return false;
            }
            SCO = aList.getNext( );
        }
        // all SCOs in the List are now validated
        grantAccess(anAuthorizationLevel);
        return true;
    } // end validate( )
} // end SecurityClass
```

The security class provides a storage location for a resource identification (312) named 'resource ID,' as well a member method named setResourceID( ) for storing (302) the resource identification. Similarly, the security class provides a field for authorization level and a method for storing (304) authorization level. The exemplary pseudocode security class provides storage in the form of a list for storing security control objects. In C++, it would be possible to store security control objects as such, but in typical embodiments, the list is used to store security control objects as references.

The security class includes a method, addSCO( ) for adding a security control object to the list. The methods aList.add( ), aList.getFirst( ), and aList.getNext( ) are member methods in a list object that effectively operate a list object as an iterator. An 'iterator' is a conventional object oriented design pattern that supports sequential calls to elements of an aggregate object without exposing underlying representation. In this example, main( ) assumes that aList.getNext( ) returns null upon reaching the end of the list. It is common also, for example, for list classes to support a separate member method called, for example, 'isDone( ),' to indicate the end of a list. Any indication of the end of a list as will occur to those of skill in the art is well within the scope of the present invention.

In addition, the exemplary pseudocode security class includes a member method, main( ), that validates security access data in turn for each security control object in the list. In this particular example, the validation method is called 'main( )' to support implementing security objects in Java, so that the validation method can be called by a call to the object name itself. On the other hand, when SecurityClass is implemented as a Java servlet, there is no requirement for a member method named 'main( ),' because, although servlets also are invoked by use of the class name itself, the interior interface requirements for servlets are different. When SecurityClass is implemented as a Java servlet, therefore, the name of the member method 'main( )' is changed to implement a member method signature from the standard Java servlet interface, such as, for example:

public void service(ServletRequest req, ServletResponse res).

The validation method main( ) operates by obtaining from the list each security control object in turn and calling in each security control object the interface member method 'validate( ).' As described in detail above, the validate( ) method in each security control object prompts for security access data, compares security access data to security control data, and return true or false according to whether the comparison succeeds or fails. SecurityClass.main( ) operates by denying access and returning false if validation fails for any security control object in the list. SecurityClass.main( ) grants access and return true if validation succeeds for all security control objects in the list.

If SecurityClass.main( ) grants access, the access granted has the authorization level set by the member method setAuthorizationLevel( ). More particularly, in the method of FIG. 2, determining (220) access (222) includes authorizing a level of access in dependence upon the authorization level of access for the resource (314 on FIG. 3). In the example of security objects implemented to accept calls from hyperlinks in web pages displayed in browsers on client devices located remotely across a network, the security objects themselves often are implemented as servlets or CGI programs that administer HTTP GET and PUT request messages. In such exemplary embodiments, a security object granting access to a resource having only 'read' authorization level would honor a GET request by transmitting to the client browser a copy of the resource in HTML. The same exemplary security object, however, would not honor a PUT request for writing data to the resource.

Figure 4:
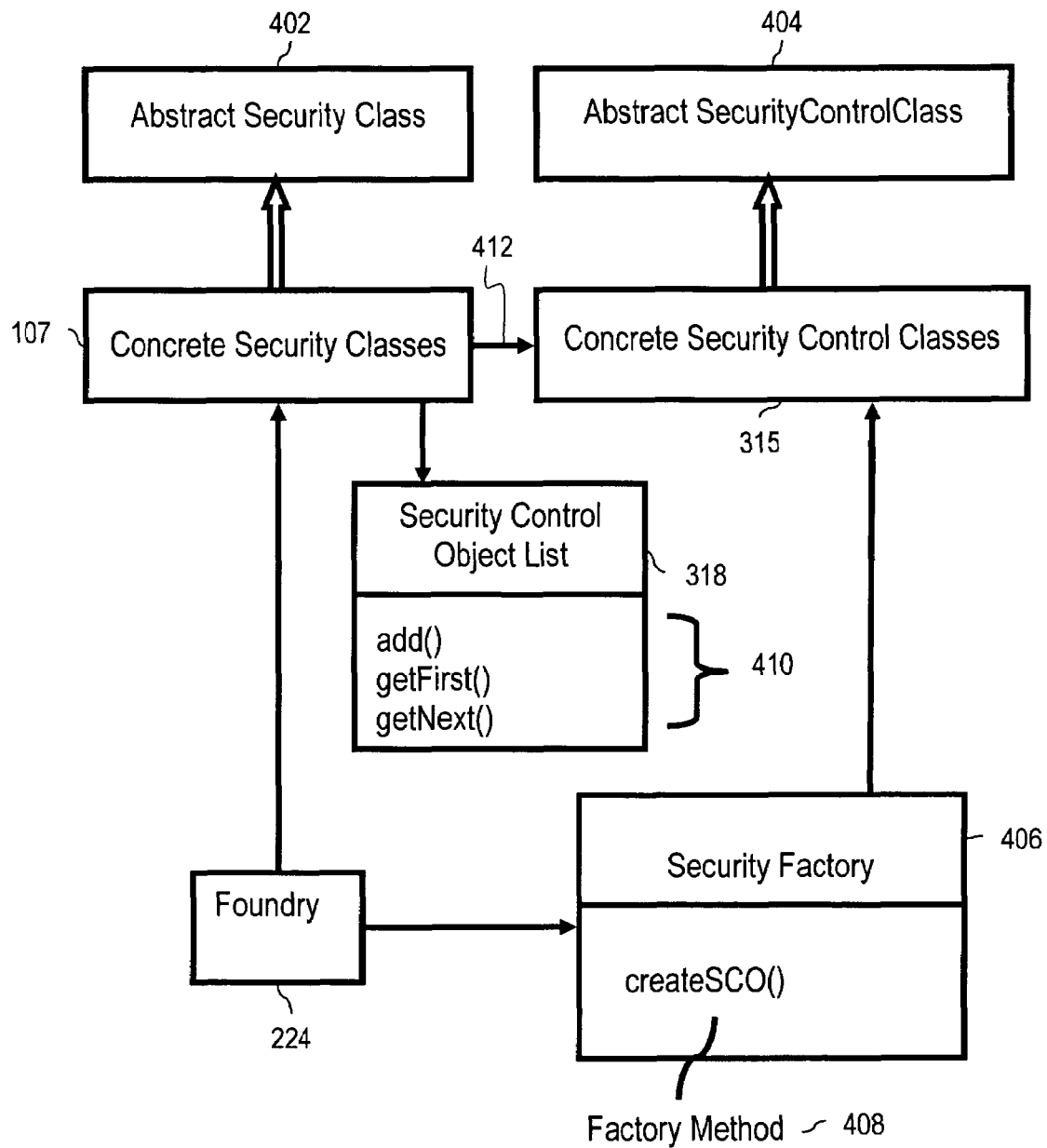
FIG. 4 sets forth a class relations diagram including a security class and a security control class.

FIG. 4 sets forth a class relations diagram summarizing exemplary relations among classes and objects useful in various embodiments of the present invention. As shown in FIG. 4, in many embodiments, concretes security classes (108), from which security objects are instantiated, are subclasses that inherit from abstract security classes (402). Similarly, concrete security control classes (316), from which security control objects are instantiated, are subclasses that inherit from abstract security control classes (404).

In addition, it is useful to remember that 'abstract,' as the term is used here to describe classes, is used in support of interface definition, in a fashion similar to its use in the terminology of C++. In Java, structures that here are called abstract classes would be called 'interfaces,' as such. No doubt such structures have other names in other environments, but here they are called 'abstract classes' and used to illustrate declarations of object oriented interfaces.

Foundries (224) are shown in FIG. 4 as classes having references to factory classes (406) and concrete security classes (108). Foundries (224), as described in detail above, cooperate with factories (406) and security objects instantiated from concrete security classes (316) by passing to security objects references to security control objects for inclusion in security control object lists (318). The arrow (412) can be drawn between security classes (108) and security control classes (316), indicating that a security class 'has a' security control class, because the reference needed to implement the object oriented 'has a' relationship is provided to the security class by a foundry (224) for storage in a security control object list (318).

Security control object lists (318) are often implemented as container objects from a standard library in, for example, C++ or Java. That is, a security control object list (318) is typically a class object aggregated by reference to a security object instantiated from a security class (108). With member methods (410) such as add( ), getFirst( ), and getNext( ), a security control object list (318) often can function as a so called 'iterator,' greatly easing manipulation of security control objects on behalf of a security object. Iterator operations are illustrated in the pseudocode above for SecurityClass.

Again referring to FIG. 2, the illustrated method includes deploying (226) a security object. Security objects can be created (206) on a client device and deployed (226) to a client device (102), including the same client device on which the security object is created, or to a server (106). Security objects can be created (206) on a server and deployed (226) to a server (106), including the same server on which the security object is created, or to a client device (102). Deployment can be local, that is, within the same client device or server, or within a trusted LAN.

Deployment can be remote, that is, across public networks, such as, for example, the Internet or the World Wide Web. One advantageous mode of remote deployment, for example, is a download of a security object implemented as a Java applet to a Java-enabled web browser. An applet is a Java program designed to be run from another program, such as a browser, rather than directly from an operating system. Because applets typically are small in file size, cross-platform compatible, and highly secure (can't be used to access users' hard drives), they are useful for small Internet applications accessible from a browser, including, for example, security objects according to the present invention.

More particularly, in some embodiments according to the method of FIG. 2, a resource (112) resides on a resource server (110), and the method includes deploying (226) the security object (108) on a security server (106) and receiving (208) the request for access to the resource in a security server (106) from a client device (102) across a network (202). Network (202), as mentioned above, can be any network, public or private, local area or wide area, wireless or wired. In embodiments according to this aspect of the invention, receiving (208) a request for access (210) is typically carried out through some form of remote procedure call, such as, for example, a hyperlink to a Java servlet, a hyperlink to a CGI function, a call to a member method in a CORBA object, a remote object call through a Java RMI interface, or a remote object call through a DCOM interface.

In a further aspect of the method of FIG. 2, a resource (112) resides on a client device (102), and the client device has an application program (120 on FIG. 1c) that accesses the resource. In this kind of embodiment, the method includes deploying (226) the security object (108) on the client device (102), effecting an architecture like the one shown in FIG. 1c. In this configuration, receiving (208) a request (210) for access to the resource (112) includes receiving (208) the request for access to the resource in the security object itself as a call to the security method (218). In some embodiments of this kind, in fact, a security object (108) can be compiled right into the client application (120), so that receiving a request for access is implemented as a conventional local function call, with no particular need for remote procedure calling methodologies such as those listed above—hyperlinks, CORBA, Java RMI, and so on.

In some embodiments of the present invention receiving (208) a request for access (210) to a resource (112) comprises a call to a security method (218) in a security object (108). Such direct calls can be implemented through Java, for example, by naming the security method (218) 'main( )' and issuing a call of the form 'java SecurityObjectName.' Alternatively, a call may be issued from a hyperlink in a browser to a security method in a security object implemented as a Java servlet by including in an HTTP request message a URI of the form:

http://ServerName/servlet/MySecurityObject where MySecurityObject is the name of a security object implemented as a servlet and containing a security method named according to the conventions of the standard Java servlet interface, that is, for example, named 'service( ).'

Figure 5:
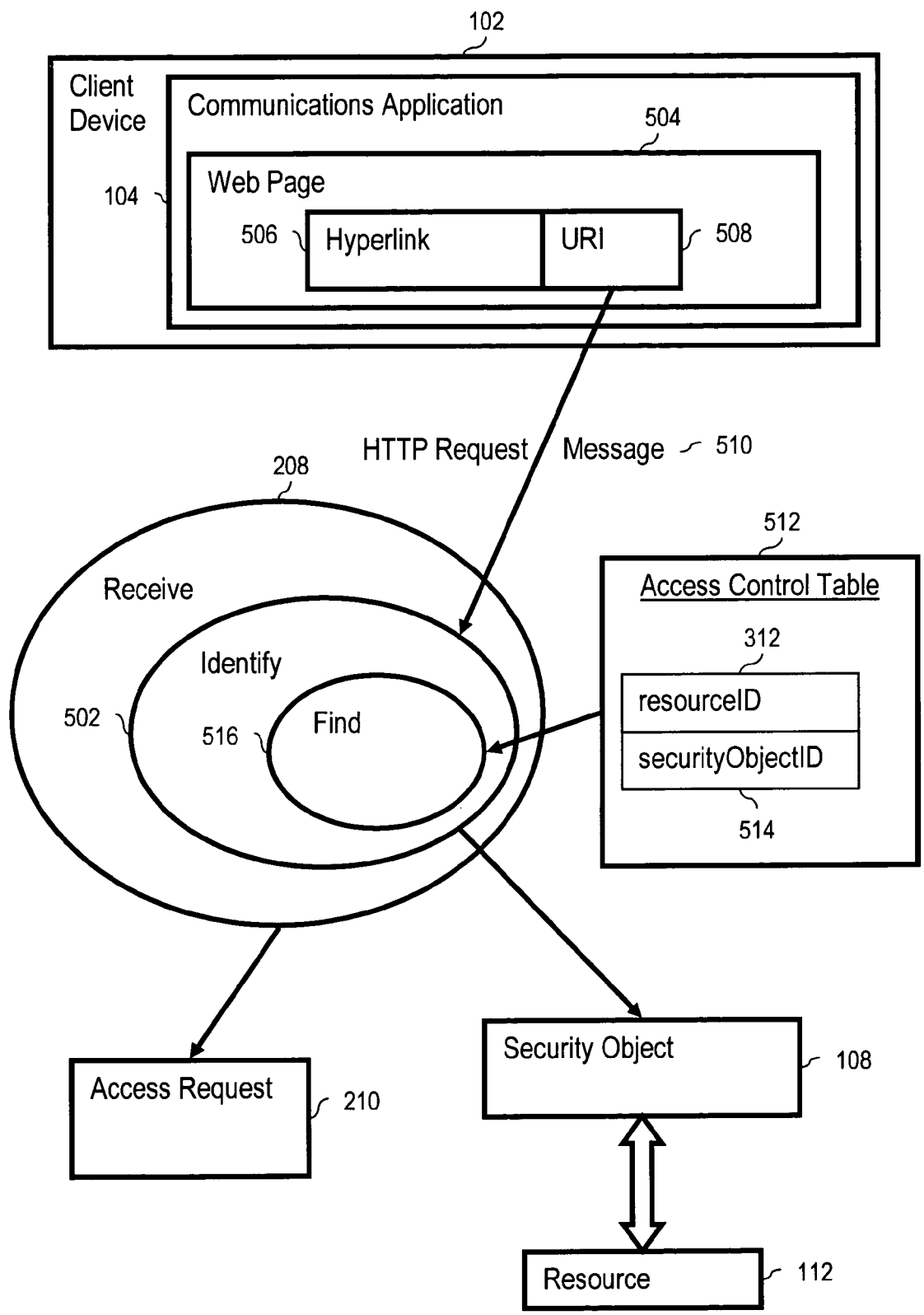
FIG. 5 sets forth a data flow diagram depicting exemplary methods of receiving requests for access to resources.

FIG. 5 sets forth a data flow diagram illustrating more detailed embodiments of receiving (208) a request (210) for access to a resource. In one method according to FIG. 5, receiving (208) a request (210) for access to a resource (112) includes identifying (502) a security object (108), that is, identifying a security object that controls access to the resource. Consider the example mentioned earlier of a security object (108) implemented as a Java servlet. In such an exemplary embodiment, identifying (502) the security object (108) comprises identifying the security object in dependence upon a URI (508). Typically, the URI (508) originates from a hyperlink (506) in a web page (504) in a communications application (104) in a client device (102). The communications application can be, for example, a browser in a client device that is a personal computer or a microbrowser in a client device that is a web-enabled cell phone. Such embodiments typically communicate the identification of the security object in the form of an HTTP request message containing the URI. The URI can have this form:

http://ServerName/servlet/MySecurityObject from which a servlet-enabled server can invoke the security object as a servlet named MySecurityObject. The server does not invoke the security object in the sense of calling it as such. The server 'invokes' the security object in that the server calls a member method within the security object according to the conventions of the standard Java servlet interface. In this example, the identity of the security object was known to the calling application.

It is possible, however, that the calling application may know the identity of a resource without knowing the identity of the security object that controls access to the resource. In such an exemplary embodiment, a request for access to a secured resource may arrive in an HTTP request directed at a resource that is a document identified as:

http://ServerName/SomeoneElse'sFiles/Document123.

For use in such embodiments, in one method according to FIG. 5, identifying (502) the security object (108) includes identifying the security object in dependence upon a URI (508) that identifies the resource (112), including finding (516), in dependence upon the URI (508) identifying the resource (112), an identification (514) of the security object in an access control table (512).

Although in this example, where the access request came with a URI, the identification (312) of the resource is, for example, a URI or a filename or pathname extracted from a URI. In embodiments of the invention generally, there is no requirement that the communications application be a browser or use HTTP for its communications. The resource identification (312) can be any digital identification, including for example, a filename or pathname communicated in a plaintext string or in cyphertext.

DO GLOBAL ON 'IDENTIFIER . . . '

The identification (514) of the security object can be the security object name, for example, or, in the example where the security object is implemented as a Java servlet, the identification (514) of the security object can be a URI in the now familiar form:

http://ServerName/servlet/MySecurityObject.

In this kind of embodiment, a security server is programmed upon receiving a request for access, to check an access control table (512). In fact, this small change in the overall programming of the security server, is the only thing that makes it a 'security server' within the meaning of the present invention. The security server needs no other security-related service upon it. Security authentication and authorization are handled by the security object. All the security server needs to do is look up the identity of the security object and invoke it. 'Invoke' in this sense means to call the security method in the security object by, for example, a call to 'java SecurityObjectName' for a security object implemented as a standard Java class, a call to 'http://ServerName/servlet/MySecurityObject' for a security object implemented as a Java servlet, or a call to 'SecurityObjectName' for a security object implemented as a C++ program. If the security server can find no security object for the resource identified in a request for access, then the security server continues its normal operations. If the security server is programmed to grant access only upon finding a corresponding security object, then the security server denies access when no such object is found in the access control table. If the security server has other security services available upon it, then it is often programmed to apply them in its usual fashion.

Alternatively, if the security server has no other security services available upon it, it may be programmed to comply with HTTP request messages on their own terms according to whether they are GET messages, PUT messages, and so on. In other words, the security server can implement the standard operations of a web server. This implementation is a little riskier than the other two examples mentioned just above but it has the advantage of being very easy to implement, requiring as it does only one small change to the source code of a conventional web server just to do one lookup in an access control table and, if the lookup succeeds, invoke a security object identified in the lookup.

By this point in this disclosure, several advantages of using various embodiments of the present invention are clear. One advantage is pure flexibility, especially at the user level and the application level. Embodiments of the present invention can make foundry applications available to ordinary users, rather then just to system administrators. Any user can choose to associate with any resource any kind of security data supported in a security system. Users can decide for themselves whether they want just a plain text logon ID and/or something much more elaborate—a fingerprint, a voiceprint, a retinal scan, and so on. As a result, users can be given great freedom in defining the security content and security level for securing users' resources, much greater freedom than available to users in prior art systems.

Another advantage of security objects according to the present invention is that security servers, communications servers, resource servers such as document or application servers—none of the servers in networks need to have any particular concern with security beyond associating a security object with a resource. Moreover, as mentioned above, it is possible within the present invention to establish a regime in which all resources in a particular location are accessed only indirectly through security objects, in which case, a server providing access to such resources need have upon it no other security service whatsoever, at least as regards authentication and authority level. In particular, servers that administer access to resources need not be concerned with the type of security data provided by users or required to qualify for access to a resource.

Another advantage of the present invention relates to encryption. As described above, certain elements of security control data are advantageously stored in encrypted form. Persons seeking unauthorized access to resources may seek to decrypt such security control data. Such unauthorized access is made much more difficult by a need, easily established by any properly authorized user, to decrypt not only a single security control data element such as a password, but also to decrypt multiple security control data elements including fingerprints, retinal scans, voiceprints, and so on.

Another advantage of the present invention is the ease with which a user can arrange multiple access authorization for multiple users. A user authorized to do so, under the present invention, can simply create multiple security objects for a single resource and distribute, for example, a URI identifying each such separate security object to separate users. By such usage, a user can quickly grant with respect to a particular document, for example, 'read' access to Jane Smith, 'read' access to Joe Blow, 'write' access to Mike Walker, and reserve 'execute' access to the original user, the owner of the document. The security control data can be set differently in each of the separate security objects all of which point to the same document, therefore preventing Jane and Joe from using Mike's security object to gain access, even if they can gain access to Mike's security object.

Another advantage is reduction of security responsibility on the part of server system administrators. This advantage obtains because security objects of the present invention tend to upcast security control from communications protocols layers to application layers. "Layers" in this context refers to the standard data communications protocol stack in which the IP protocol resides in layer 3, the so called 'network layer,' and the Transmission Control Protocol, or "tcp," resides in layer 4, the so called transport layer. In this context, SSL is considered a layer 4 security protocol, and the well known protocol for virtual private networking known as "IPSec" is considered a layer 3 protocol. In this disclosure, any functionality above layer 4 is described as residing in an 'application layer.' Therefore security objects according to the present invention are considered to be application layer software. As such, security objects and their operations in securing access to resources are completely transparent to systems administrators working on layer 4 or layer 3 security systems. In fact, it is possible to structure web servers as security servers, as mentioned above, so that such security servers have little or no concern regarding whether layer 4 or layer 3 security systems even exist at all. This is potentially a dramatic shift in security responsibilities for system administrators, including, for example, system administrators in Internet Service Providers or 'ISPs.'

It will be understood from the foregoing description that various modifications and changes may be made, and in fact will be made, in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method of controlling access to a resource residing on a resource serve, the method comprising:
    creating a security object in dependence upon user-selected security control data type, the security object comprising security control data and at least one security method, wherein creating the security object further comprises:
    storing in the security object a resource identification for the resource;
    storing in the security object an authorization level of access for the resource;
    storing in the security object user-selected security control data type; and
    storing, in the security object, security control data for each user-selected security control data type;
deploying the security object on a security server;
receiving a request for access to the resource, wherein receiving a request for access to the resource further comprises:
    receiving the request for access to the resource in a security server from a client device across a network;
    identifying the security object in dependence upon a URI, wherein identifying the security object comprises identifying the security object in dependence upon a URI that identifies the resource, including finding, in dependence upon the URI identifying the resource, an identification of the security object in an access control table; and
    calling the security method;
receiving security request data; and
determining access to the resource in dependence upon the security control data and the security request data.

2. The method of claim 1 wherein determining access includes authorizing a level of access in dependence upon the authorization level of access for the resource.

* * * * *